(12) United States Patent
Hentschke et al.

(10) Patent No.: US 11,092,191 B2
(45) Date of Patent: Aug. 17, 2021

(54) METHOD FOR PRODUCING A BEARING BODY OF A SLIDING BEARING ARRANGEMENT AND BEARING BODY

(71) Applicant: Renk Aktiengesellschaft, Augsburg (DE)

(72) Inventors: Christoph Hentschke, Hannover (DE); Alexander Unger, Hannover (DE)

(73) Assignee: RENK GMBH, Augsburg (DE)

( * ) Notice: Subject to any disclaimer, the term of this patent is extended or adjusted under 35 U.S.C. 154(b) by 0 days.

(21) Appl. No.: 16/752,103

(22) Filed: Jan. 24, 2020

(65) Prior Publication Data

US 2020/0240463 A1 Jul. 30, 2020

(30) Foreign Application Priority Data

Jan. 28, 2019 (DE) .................... 10 2019 101 969.9

(51) Int. Cl.
*F16C 17/02* (2006.01)
*B21D 53/10* (2006.01)

(52) U.S. Cl.
CPC .............. *F16C 17/02* (2013.01); *B21D 53/10* (2013.01)

(58) Field of Classification Search
CPC ...... F16C 17/02; F16C 17/022; F16C 33/205; F16C 33/208; B21D 53/10; Y10T 29/49995; Y10T 428/24521; Y10T 428/24529; Y10T 428/24537; Y10T 428/2457

See application file for complete search history.

(56) References Cited

U.S. PATENT DOCUMENTS

| 1,054,265 A | * | 2/1913 | Baekeland | ............ F16C 33/208 |
| | | | | 508/105 |
| 3,362,765 A | * | 1/1968 | Pierce | ..................... F16C 17/14 |
| | | | | 384/125 |
| 2013/0023451 A1 | | 1/2013 | Matsuhisa et al. | |
| 2015/0053496 A1 | * | 2/2015 | Jomaa | .................... B62D 65/00 |
| | | | | 180/292 |
| 2016/0138652 A1 | | 5/2016 | Randlett et al. | |

FOREIGN PATENT DOCUMENTS

| CN | 200940635 Y | 8/2007 |
| DE | 102011087821 | 6/2012 |
| DE | 102016110858 | 12/2017 |

(Continued)

OTHER PUBLICATIONS

Office Action dated Apr. 28, 2020 issued in GB Patent Application No. 1917310.3.

*Primary Examiner* — Phillip A Johnson
(74) *Attorney, Agent, or Firm* — Cozen O'Connor

(57) ABSTRACT

A method for producing a housing-side or rotor-side bearing body of a sliding bearing arrangement for mounting a rotating shaft of a rotor in a fixed housing. Providing a basic body of the bearing body. Processing the basic body on a surface by forming multiple intersecting grooves, between the intersecting grooves multiple bar-like protrusions are formed. Reforming the protrusions subject-to form a defined pattern of undercut-like recesses or geometries. Applying a sliding bearing material to the surface having the reformed protrusions subject to infiltrating or filling the undercut-like recesses or geometries.

11 Claims, 4 Drawing Sheets

(56) References Cited

FOREIGN PATENT DOCUMENTS

| EP | 2796736 |   | 10/2014 |   |           |
|----|---------|---|---------|---|-----------|
| EP | 3333437 |   | 6/2018  |   |           |
| GB | 2024656 |   | 1/1980  |   |           |
| GB | 2136063 | A * | 9/1984 | ............. | F16C 33/28 |
| JP | 10037963 | A * | 2/1998 | ............. | F16C 33/28 |

* cited by examiner

METHOD FOR PRODUCING A BEARING BODY OF A SLIDING BEARING ARRANGEMENT AND BEARING BODY

BACKGROUND OF INVENTION

1. Field of the Invention

The invention relates to a method for producing a bearing body of a sliding bearing arrangement. The invention, furthermore, relates to a bearing body of a sliding bearing arrangement.

2. Description of Related Art

Sliding bearing arrangements for mounting a rotor, namely for mounting a rotating shaft of the rotor, in a housing are fundamentally known from practice. Accordingly, sliding bearing arrangements have housing-side bearing bodies, which comprise a sliding surface facing the rotor, and/or rotor-side bearing bodies, which have a sliding surface facing the stator.

In bearing bodies of a sliding bearing arrangement, the sliding surface of the respective bearing body is provided by a sliding bearing material, which is applied to a surface of a basic body of the respective bearing body. Permanently applying the sliding bearing material, which forms the sliding surface, to the basic body proves difficult.

To permanently apply a sliding bearing material to a surface of a basic body it is known from DE 10 2011 087 821 A1 to provide an intermediate layer between the actual basic body and the sliding bearing material, which intermediate layer is formed as a porous layer. From DE 10 2016 110 858 B4 it is known to provide between the basic body and the sliding bearing material an intermediate layer of galvanically coated wires, wherein the wires form undercuts.

SUMMARY OF THE INVENTION

There is a need for manufacturing a bearing body of a sliding bearing arrangement with less effort and for a bearing body that can be manufactured with less effort.

One aspect of the present invention is based on creating a new method for producing a bearing body of a sliding bearing arrangement and a bearing body of a sliding bearing arrangement.

The method comprises at least the following: providing a basic body of the bearing body; processing the basic body on a surface, namely by forming multiple intersecting grooves, wherein between the intersecting grooves multiple bar-like projections are formed; reforming the protrusions subject to forming a defined pattern of undercut-like recesses or geometries; and applying a sliding bearing material to the surface with the reformed protrusions subject to infiltrating or filling-up the undercut-like recesses or geometries.

According to one aspect of the invention, it is proposed to subject the basic body of the bearing body, namely that surface of the same, to which the sliding bearing material is to be applied to a defined processing, wherein in a first step intersecting grooves are introduced into the surface, namely subject to forming bar-like protrusions, and wherein in a second step these protrusions are reformed in order to form a defined pattern of undercut-like recesses or geometries. The sliding bearing material is applied to this surface with the reformed protrusions, namely subject to infiltrating or filling-up the undercut-like recesses or geometries with the sliding bearing material.

By way of this, a bearing body of a sliding bearing arrangement can be provided with little effort, in which the sliding bearing material permanently and securely adheres to the basic body without it being required to apply a special intermediate layer to the basic body. On the contrary, the basic body is worked on that surface that is to carry the sliding bearing material, in the manner described above in order to provide the undercut-like recesses or geometries, via which ultimately the sliding bearing material can be securely and reliably applied to the basic body to permanently hold or fix the sliding bearing material on the basic body.

According to an advantageous further development, the reforming of the protrusions subject to forming the defined pattern of the undercut-like recesses or geometry is performed by bending. The reforming of the protrusions by bending is particularly preferred. The forming of the protrusions by metal cutting and the reforming of the protrusions by bending can take place in the same clamping of the basic body on a machine tool. By way of this, the method can be kept particularly simple.

According to an advantageous further development, the bar-like protrusions form columns or rows, wherein the bar-like protrusions in alternation of the columns and/or the rows are bent from the bar-like protrusions in different directions, preferentially in opposite directions. By way of the bending of the bar-like protrusions in the defined directions, a bending pattern can be provided which particularly preferably provides undercut-like recesses or geometries in order to permanently and securely hold the sliding bearing material on the basic body.

BRIEF DESCRIPTION OF THE DRAWINGS

Preferred further developments of the invention are obtained from the subclaims and the following description. Exemplary embodiments of the invention are explained in more detail by way of the drawing without being restricted to this.

There it shows.

DETAILED DESCRIPTION OF THE PRESENTLY PREFERRED EMBODIMENTS

The invention relates to a method for producing a bearing body of a sliding bearing arrangement and to a bearing body of a sliding bearing arrangement.

The bearing body can be both a housing-side and also a rotor-side bearing body, be it for an axial sliding bearing arrangement or for a radial sliding bearing arrangement. A housing-side bearing body is fixed on a housing and provides a sliding surface facing a rotor. A rotor-side bearing body is fixed on the rotor-side and provides a sliding surface facing the stator.

To produce a bearing body according to one aspect of the invention, a basic body 10 of the bearing body is initially provided, wherein this basic body 10 consists preferentially of a metallic material, such as, for example, steel.

Figure 1:
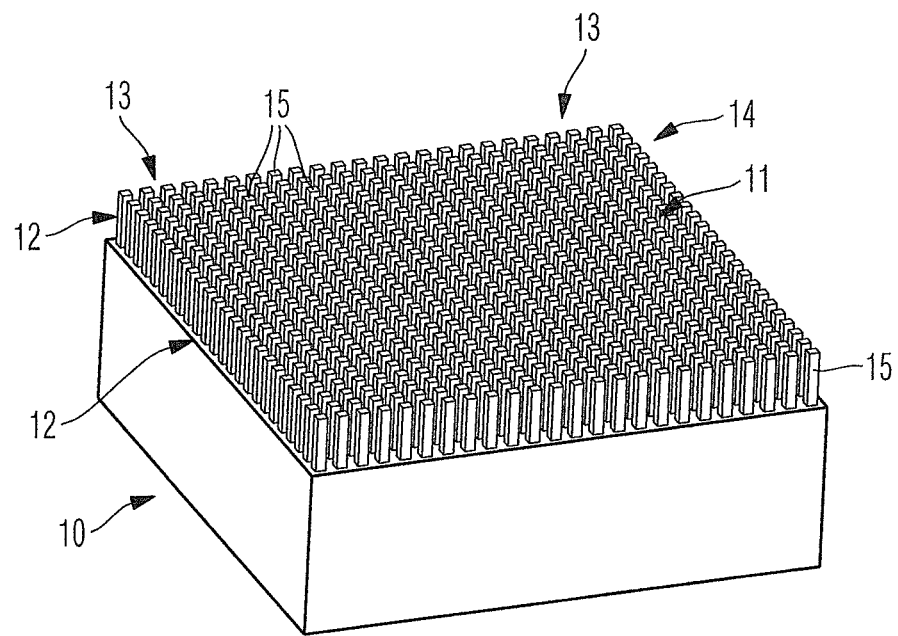
FIG. 1 is a basic body of a bearing body in an intermediate processing step of the same.

In the following, the basic body 10 is processed on at least one surface 11, to which the sliding bearing material of the bearing body is to be applied, namely by forming multiple intersecting grooves 12, 13. Accordingly, FIG. 1 shows a perspective view of a basic body 10 of a bearing body of an axial sliding bearing arrangement, on which on the surface 11 multiple grooves 12 running parallel to one another and multiple grooves 13 running parallel to one another are formed, which intersect, wherein these grooves 12, 13 in FIG. 1 run perpendicularly to one another and form an array 14 of a multiplicity of bar-like protrusions 15, which form rows and columns.

Figure 2:
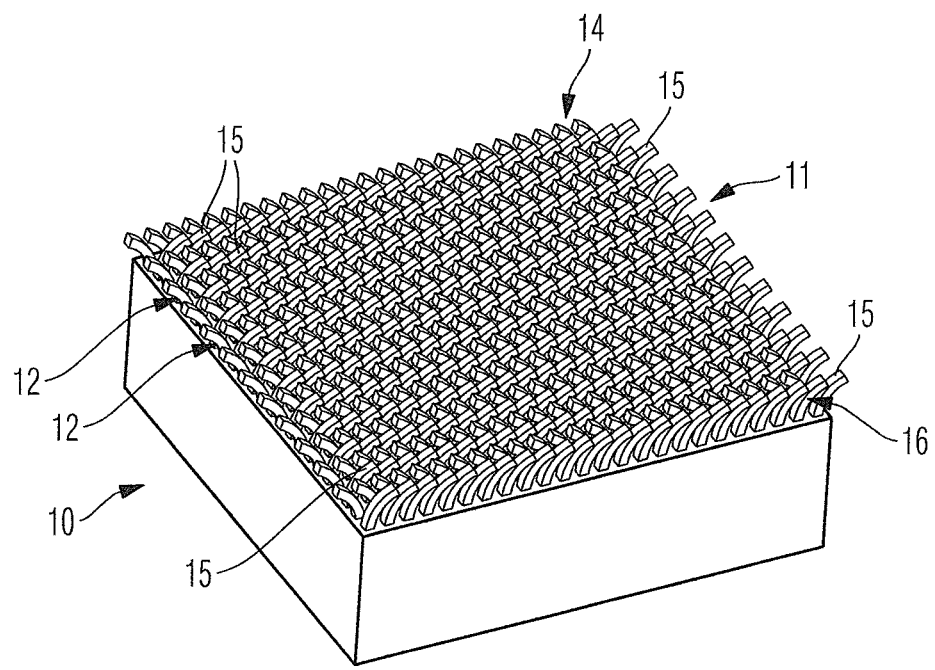
FIG. 2 is the basic body of FIG. 1 according to a further processing step.

In a following processing step, the bar-like protrusions 15 are subjected to a reforming shown in FIG. 2, in particular by bending the bar-like protrusions 15, as a result of which on the surface 11 undercut-like recesses or geometries 16 are formed.

A sliding bearing material 20, in particular a thermoplastic material, such as for example polyether ether ketone (PEEK) is applied to the surface 11 with the reformed protrusions 15 worked in this manner, namely subject to infiltrating or filling-up the undercut-like recesses or geometries 16. By way of this, a particularly secure adherence of the sliding bearing material to the surface 11 of the basic body 10 of the bearing body can be ensured.

In FIG. 2, the protrusions 15 are reformed by bending in such a manner that in alternation of the rows of bar-like protrusions 15 shown in FIG. 2, the protrusions 15 are bent over in different directions, namely in opposite directions.

Thus, the protrusions 15 of the rows are alternately altogether bent over in a first direction to the left or all together in a second opposite direction to the right. Between the individual rows of bar-like protrusions 15 that are bent over in different directions, the continuous grooves 12 are still formed as before, but the grooves 13 by contrast are no longer continuously free because of this bending-over.

It can be provided to additionally bend over the bar-like protrusions 15 also by columns, in particular in such a manner that protrusions 15 bent over to the right are additionally bent over perpendicularly thereto towards the front and/or protrusions 15 bent over to the left are additionally bent over in the opposite direction thereto towards the back.

A multiplicity of bending patterns for the bar-like protrusions 15 is conceivable in order to provide suitable undercut-like recesses or geometries 16, which ultimately make possible a secure adherence of the sliding bearing material to the basic body 10.

Figure 3:
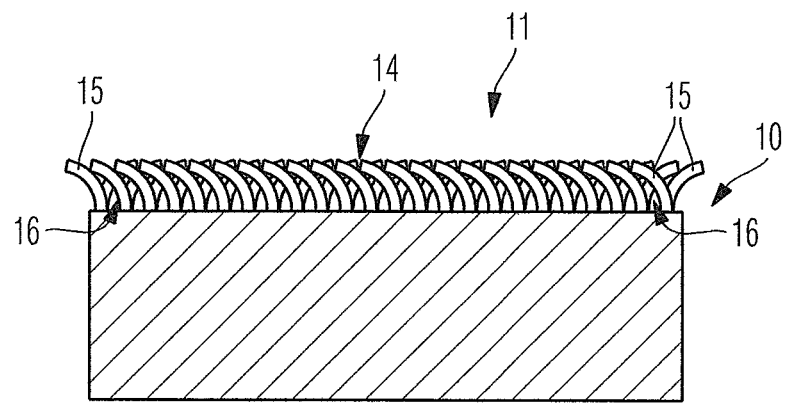
FIG. 3 is a cross section through FIG. 2.
Figure 4:
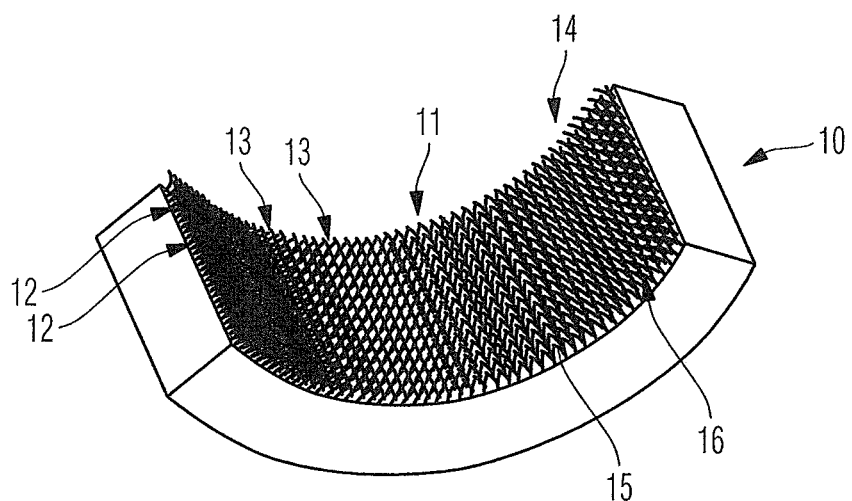
FIG. 4 is a further basic body of a bearing body in a state analogous to FIG. 2.
Figure 5:
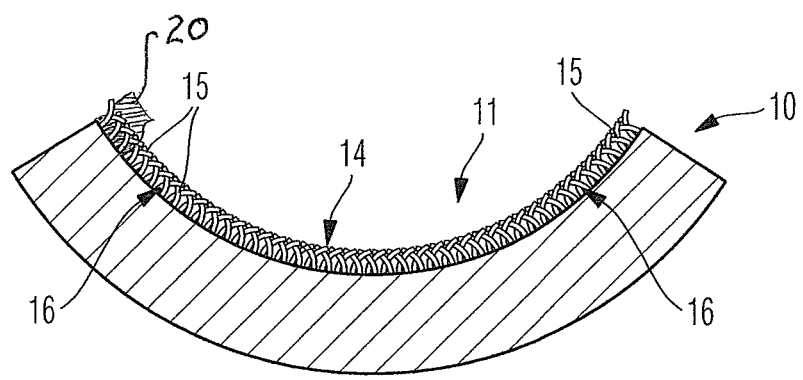
FIG. 5 is a cross section through FIG. 4.

FIGS. 4 and 5 show details of a basic body 10 of a bearing body of a radial sliding bearing arrangement, wherein the bearing body is a radial bearing segment, which does not extend round about the entire circumference of a shaft to be mounted, but merely roundabout a part region of the circumference. On its radially inner surface 11, this basic body 10 is processed analogously to the basic body 10 of an axial sliding bearing arrangement shown in FIGS. 1 to 3. For this reason, same reference numbers are used for same assemblies to avoid unnecessary repetitions. Reference can be made to the above explanations regarding the exemplary embodiment of FIGS. 1 to 3.

Figure 6:
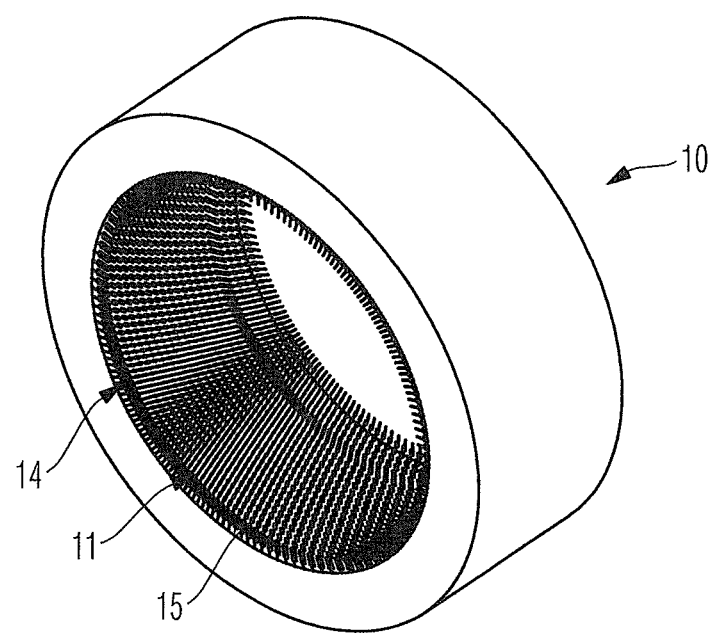
FIG. 6 is a further basic body of a bearing body in a state analogous to FIG. 2.

FIG. 6 shows a basic body 10 for a radial sliding bearing arrangement which extends, closed in the circumferential direction, round about a shaft to be mounted. On its radially inner surface 11, this basic body 10 is processed analogously to the basic body 10 of the exemplary embodiment of FIGS. 1 to 3 and FIGS. 4 and 5 respectively, so that for FIG. 6 in turn reference can be made to the above explanations.

The exemplary embodiments shown in FIGS. 1 to 3, FIGS. 4 and 5, as well as FIG. 6 are in particular stator-side bearing bodies or basic bodies 10 for stator-side bearing bodies, which accordingly are tied to a stator and on a surface facing the rotor are processed in the manner described above and provided with the sliding bearing material.

Figure 7:
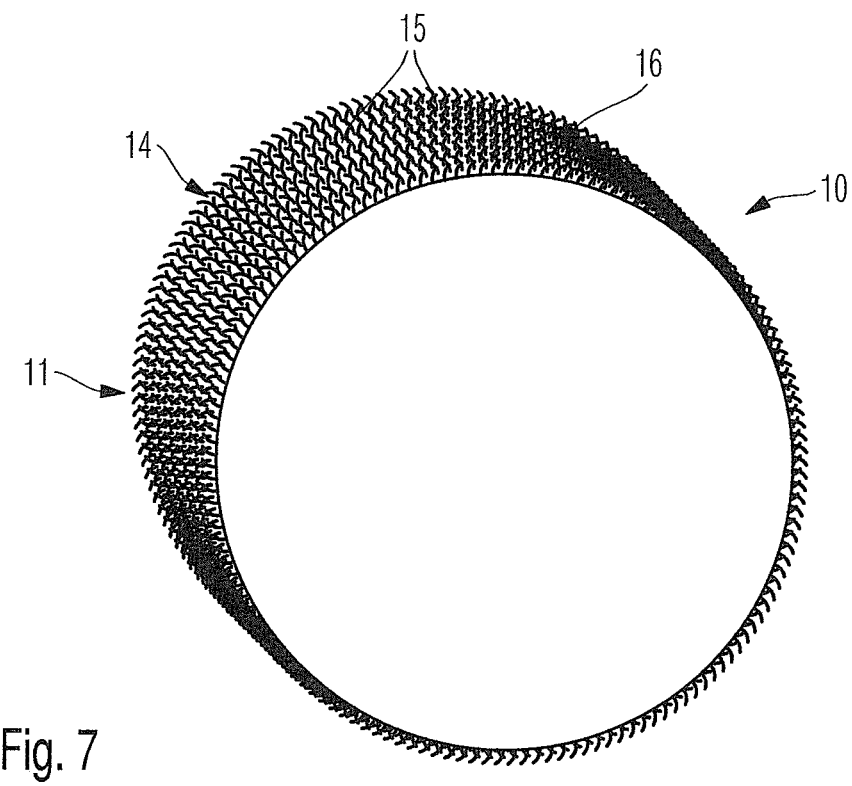
FIG. 7 is a further basic body of a bearing body in a state analogous to FIG. 2.
Figure 8:
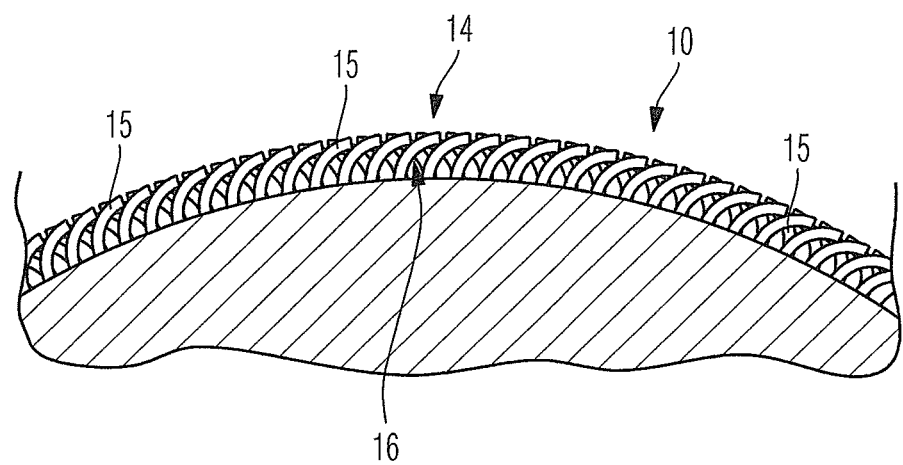
FIG. 8 is a partial cross section through FIG. 6.

Compared with this, FIGS. 7 and 8 show a basic body 10 for a rotor-side bearing body, which on a surface 11, namely on a radially outer surface 11, which faces a stator later on, is processed subject to forming the bar-like reformed protrusions 15, in order to form the undercut-like recesses or geometries 16. The sliding bearing material is to be applied to this surface 11 with the bent-over protrusions 15, namely again subject to filling-up or infiltrating the undercut-like recesses or geometries 16, which form the bent-over protrusions 15, in order to thus ensure a secure holding of the sliding bearing material on the basic body 10.

Accordingly, the invention proposes a method for producing a bearing body of a sliding bearing arrangement and a bearing body of a sliding bearing arrangement, wherein the bearing body comprises the respective basic body 10, which on a surface 11, to which the sliding bearing material is to be applied, is processed initially subject to forming intersecting grooves 12, 13 and the bar-like protrusions 15 in particular by way of a cutting process.

By reforming the protrusions 15, the undercut-like recesses or geometries 16 are subsequently formed, which ultimately make possible the secure adherence of the sliding bearing material on the respective surface 11 of the respective basic body 10 of the bearing body.

As already explained, the bearing bodies can be bearing bodies for an axial sliding bearing arrangement or bearing bodies for a radial sliding bearing arrangement, preferentially, the bearing segments are for an axial sliding bearing arrangement or the bearing segments are for a radial sliding bearing arrangement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for producing a housing-side or rotor-side bearing body of a sliding bearing arrangement, comprising:
   providing a basic body of the bearing body;
   processing the basic body on a surface by forming multiple first and second intersecting grooves, wherein between the multiple first and second intersecting grooves multiple protrusions are formed;

reforming the protrusions to form a defined pattern of undercut recesses or geometries; and applying a sliding bearing material to the surface with the reformed protrusions subject to infiltrating or filling-out the undercut recesses or geometries.

2. The method according to claim 1, wherein the multiple first intersecting grooves run perpendicularly to the multiple second intersecting grooves.

3. The method according to claim 1, wherein the reforming of the protrusions is effected by bending.

4. The method according to claim 1, wherein the protrusions in alternation of columns and/or rows are bent from the protrusions in different directions.

5. The method according to claim 4, wherein the protrusions in alternation of the columns and/or rows are bent from the protrusions in opposite directions.

6. The method according to claim 1, wherein the basic body is a metallic material.

7. The method according to claim 1, wherein a thermoplastic sliding bearing material is applied to the surface with the reformed protrusions as the sliding bearing material.

8. The method according to claim 1, wherein the bearing body is configured to mount a rotating shaft of a rotor in a fixed housing.

9. A bearing body of a sliding bearing arrangement, comprising:

a basic body;

first and second intersecting grooves formed on a surface of the basic body;

multiple protrusions defined by the first and second intersecting grooves, wherein the protrusions are reformed to form a defined pattern of undercut recesses or geometries; and a sliding bearing material applied to the surface with the reformed protrusions subject to infiltrating or filling-out the undercut recesses or geometries.

10. The bearing body according to claim 9, wherein the bearing body is configured to mount a rotating shaft of a rotor in a fixed housing.

11. A bearing body formed by:

providing a basic body of the bearing body;

processing the basic body on a surface by forming multiple first and second intersecting grooves, wherein between the multiple first and second intersecting grooves multiple protrusions are formed;

reforming the protrusions to form a defined pattern of undercut recesses or geometries; and applying a sliding bearing material to the surface with the reformed protrusions subject to infiltrating or filling-out the undercut recesses or geometries.

* * * * *